(12) United States Patent
Wang et al.

(10) Patent No.: US 10,425,018 B2
(45) Date of Patent: Sep. 24, 2019

(54) TRIBOELECTRIC NANOGENERATOR FOR HARVESTING BROADBAND KINETIC IMPACT ENERGY

(71) Applicants: Zhong Lin Wang, Atlanta, GA (US); Xiaonan Wen, Atlanta, GA (US); Weiqing Yang, Atlanta, GA (US)

(72) Inventors: Zhong Lin Wang, Atlanta, GA (US); Xiaonan Wen, Atlanta, GA (US); Weiqing Yang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 404 days.

(21) Appl. No.: 15/159,225

(22) Filed: May 19, 2016

(65) Prior Publication Data

US 2016/0344308 A1 Nov. 24, 2016

Related U.S. Application Data

(60) Provisional application No. 62/163,692, filed on May 19, 2015.

(51) Int. Cl.
*H02N 1/04* (2006.01)
*H02N 1/00* (2006.01)

(52) U.S. Cl.
CPC ..................... *H02N 1/04* (2013.01)

(58) Field of Classification Search
CPC .. H02N 1/04; H02N 1/06; H02N 1/10; H02N 1/00
See application file for complete search history.

(56) References Cited

U.S. PATENT DOCUMENTS 3,086,131 A 4/1963 Ballentine
4,126,822 A 11/1978 Wahlstrom
(Continued)

FOREIGN PATENT DOCUMENTS

WO WO-2014169724 A1 * 10/2014 ............... H02N 1/04
WO WO-2014193182 A1 * 12/2014 ............... H02N 1/04

OTHER PUBLICATIONS

ISA: "Notification of Transmittal of the International Search Report and the Written Opinion of the International Searching Authority, or the Declaration"; WIPO dated Feb. 22, 2013.
(Continued)

*Primary Examiner* — Edgardo San Martin
(74) *Attorney, Agent, or Firm* — Bryan W. Bockhop; Bockhop Intellectual Property Law, LLC

(57) ABSTRACT

A triboelectric generator includes a first triboelectric member, which includes a first conductive layer and an insulating triboelectric material layer disposed on the first conductive layer. The triboelectric material layer includes a first material having a first position on a triboelectric series. An elastic member, disposed against the triboelectric material layer of the triboelectric member and includes a second conductive material, has an elasticity that results in the elastic member being deformed when compressed and returning to an original non-deformed shape after being compressed. The second conductive material has a second position on the triboelectric series. A first load is coupled to the first conductive layer and with the second conductive material so that when a force compresses the elastic member charges will flow between the first conductive layer and the second conductive layer through the load.

16 Claims, 5 Drawing Sheets

(56) References Cited

U.S. PATENT DOCUMENTS

| | | | |
|---|---|---|---|
| 4,990,813 | A | 2/1991 | Paramo |
| 8,193,655 | B2 | 6/2012 | Roberts et al. |
| 8,536,760 | B1 * | 9/2013 | Kim, II ................. H02N 11/002 |
| | | | 310/309 |
| 9,178,446 | B2 | 11/2015 | Wang et al. |
| 9,490,306 | B2 * | 11/2016 | Kim .................... H01L 27/3225 |
| 9,543,860 | B2 * | 1/2017 | Wang ....................... H02N 1/04 |
| 9,595,892 | B2 * | 3/2017 | Takahashi ............... H02N 1/04 |
| 9,595,894 | B2 * | 3/2017 | Wang ........................ H02N 1/04 |
| 9,825,558 | B2 * | 11/2017 | Zhang ....................... H02N 1/04 |
| 9,887,644 | B2 * | 2/2018 | Kim .......................... H02N 1/04 |
| 9,906,170 | B2 * | 2/2018 | Choi ......................... H02N 1/04 |
| 9,985,554 | B2 * | 5/2018 | Wang ........................ H02N 1/04 |
| 2005/0048293 | A1 | 3/2005 | Rood |
| 2006/0064826 | A1 | 3/2006 | Kimball |
| 2006/0280322 | A1 | 12/2006 | Abe |
| 2008/0036038 | A1 | 2/2008 | Hersee et al. |
| 2008/0138602 | A1 | 6/2008 | Canham et al. |
| 2009/0130588 | A1 | 5/2009 | Veregin et al. |
| 2010/0133006 | A1 | 6/2010 | Shakra et al. |
| 2011/0050181 | A1 | 5/2011 | Post et al. |
| 2013/0020909 | A1 * | 1/2013 | Kim .......................... H02N 2/18 |
| | | | 310/339 |
| 2014/0084748 | A1 | 3/2014 | Wang et al. |
| 2014/0246950 | A1 | 9/2014 | Wang et al. |
| 2015/0363019 | A1 * | 12/2015 | Schediwy ............... G06F 3/044 |
| | | | 345/174 |
| 2016/0028327 | A1 | 1/2016 | Aliane |
| 2016/0040648 | A1 * | 2/2016 | Wang ....................... F03B 13/14 |
| | | | 290/42 |
| 2016/0065091 | A1 * | 3/2016 | Wang ........................ H02N 1/04 |
| | | | 310/300 |
| 2016/0218640 | A1 * | 7/2016 | Wang ........................ H02N 1/04 |
| 2016/0336505 | A1 * | 11/2016 | Arizumi ................ H01L 41/113 |
| 2016/0373028 | A1 * | 12/2016 | He ............................ H02N 1/04 |
| 2017/0331397 | A1 * | 11/2017 | Kim .......................... H02N 1/04 |
| 2017/0370352 | A1 * | 12/2017 | Fujita ........................ B81B 5/00 |
| 2018/0024668 | A1 * | 1/2018 | Byun ..................... G02F 1/0136 |
| | | | 345/174 |
| 2018/0123482 | A1 * | 5/2018 | Kim ........................ H02N 1/04 |

OTHER PUBLICATIONS

Zhu, Guang: "Triboelectric-Generator-Driven Pulse Electrodeposition for Micropatterning"; Nano Letters, Aug. 13, 2012; ACS.

Notification of Related Application: U.S. Appl. No. 13/598,132, filed on Aug. 29, 2012 by Wang et al. and commonly owned by the assignee of the present application includes subject matter related to the present application.

Notification of Related Application: U.S. Appl. No. 14/032,864, filed on Sep. 20, 2013 by Wang et al. and commonly owned by the assignee of the present application includes subject matter related to the present application.

Notification of Related Application: U.S. Appl. No. 14/818,982, filed on Aug. 5, 2015 by Wang et al. and commonly owned by the assignee of the present application includes subject matter related to the present application.

Yuanjie Su et al."Hybrid triboelectric nanogenerator for harvesting water wave energy and as a self-powered distress Q3 signal emitter"; Jul. 10, 2014; Elsiver.

Sihong Wang et al.: "Triboelectric nanogenerators as self-powered active sensors"; Nov. 8, 2014; Elsiver.

Youfan Hu et al.: "Recent progress in piezoelectric nanogenerators as a sustainable power source in self-powered systems and active sensors"; Nov. 7, 2014; Elsiver.

* cited by examiner

TRIBOELECTRIC NANOGENERATOR FOR HARVESTING BROADBAND KINETIC IMPACT ENERGY

CROSS-REFERENCE TO RELATED APPLICATION(S)

This application claims the benefit of U.S. Provisional Patent Application Ser. No. 62/163,692, filed May 19, 2015, the entirety of which is hereby incorporated herein by reference.

STATEMENT OF GOVERNMENT INTEREST

This invention was made with government support under agreement No. DE-FG02-07ER46394, awarded by the Department of Energy. The government has certain rights in the invention.

BACKGROUND OF THE INVENTION

1. Field of the Invention

The present invention relates to generators and, more specifically, to a system for generating voltage and current using the triboelectric effect.

2. Description of the Related Art

Energy harvesting by converting ambient energy into electricity may offset the reliance of small portable electronics on traditional power supplies, such as batteries. When long-term operation of a large number of electronic devices in dispersed locations is required, energy harvesting has the advantages of outstanding longevity, relatively little maintenance, minimal disposal and contamination.

When two materials, at least one of which is non-conducting, come into contact with each other, a chemical bond, known as adhesion, is formed between the two materials. Depending on the triboelectric properties of the materials, one material may "capture" some of the electrons from the other material. If the two materials are separated from each other, a charge imbalance will occur. The material that captured the electron will negatively charged and the material that lost an electron will be positively charged. This charge imbalance gives rise to what is sometimes referred to as "static electricity." The term "static" in this case is somewhat deceptive, as it implies a lack of motion when in reality motion is necessary for charge imbalances to flow. The spark one feels upon touching a door knob is an example of such flow.

The triboelectric effect is a type of contact electrification in which certain materials become electrically charged after they come into contact with another such as through friction. It is the mechanism though which static electricity is generated. The triboelectric effects associated electrostatic phenomena are the most common electrical phenomena in daily life, from walking to driving. However, the triboelectric effect has been largely ignored as an energy source for electricity. Some electrostatic micro-generators have been developed and used in research relating to micro-electromechanical systems (MEMS), but such designs rely on an extra voltage source to charge electrode plates instead of harnessing triboelectric effect, leading to complicated structures and fabrication processes.

Previously demonstrated triboelectric generators require periodic contact and vertical separation of two materials that have opposite triboelectric polarities, making it only applicable to harvest energy from intermittent impact or shock. Such systems typically include a cavity with a constantly changing volume, which makes packaging difficult and limits applications in atmospheres with high humidity, corrosive chemicals or gases, and in water or other liquids.

Mechanisms using piezoelectric, electrostatic or electromagnetic principles to harvest energy from random vibrations, wind flow, air pressure, or human body motions have been developed and applied as generators or self-powered sensors. Recently, the development of triboelectric nanogenerators (triboelectric generators) offers a new paradigm for fabricating high-output and cost effective generators for driving small electronics. Reciprocating motion is a very common mechanical motion occurs in natural oscillations, motion of waves, swing of human limbs, and mechanical piston movements, etc. Features of these motions that include long reciprocating distance, low frequencies and amplitude or frequency fluctuations pose challenges for previously developed vibration-harvesters, which were only suited to low-amplitude and high-frequency excitations induced by inertia forces.

Therefore, there is a need for a reliable, small and easily manufactured system for harvesting triboelectric energy from reciprocating motion.

SUMMARY OF THE INVENTION

The disadvantages of the prior art are overcome by the present invention which, in one aspect, is a triboelectric generator that includes a first triboelectric member. The first triboelectric member includes a first conductive layer and an insulating triboelectric material layer disposed on the first conductive layer. The triboelectric material layer includes a first material that has a first position on a triboelectric series. An elastic member is disposed against the triboelectric material layer of the triboelectric member and includes a second conductive material. The elastic member has an elasticity that results in the elastic member being deformed when compressed and returning to an original non-deformed shape after being compressed. The second conductive material has a second position, different from the first position, on the triboelectric series. A first load is in electrical communication with the first conductive layer and with the second conductive material so that when a force drives the first triboelectric member against the elastic member, thereby compressing the elastic member, and after the force is released from the first triboelectric member, charges will flow between the first conductive layer and the second conductive layer through the load.

In another aspect, the invention is an electrical generator that includes a first triboelectric member, which includes a first conductive layer and a triboelectric material layer disposed on the first conductive layer. The triboelectric material layer includes a plurality of nanoscale protrusions extending outwardly therefrom. The triboelectric material layer includes a first material that has a first position on a triboelectric series. An elastic member has an undulated shape and is disposed against the triboelectric material layer of the triboelectric member. The elastic member includes a dielectric layer and a second conductive layer disposed on the dielectric layer. The dielectric layer has an elasticity that results in the elastic member returning to the undulated shape after being compressed. The second conductive layer includes a second material that has a second position, different from the first position, on the triboelectric series. A first load is in electrical communication with the first conductive layer and with the second conductive layer so that when a force drives the first triboelectric member against the elastic member, thereby compressing the elastic member, and after the force is released from the first triboelectric member charges will flow between the first conductive layer and the second conductive layer through the load. A second triboelectric member is spaced apart from the first triboelectric member and includes a fourth conductive layer and a triboelectric material layer that is disposed on the third conductive layer. The triboelectric material layer includes a plurality of nanoscale protrusions extending outwardly therefrom. The triboelectric material layer includes the first material. The second triboelectric member is disposed so that the plurality of nanoscale protrusions of the first triboelectric member face the plurality of nanoscale protrusions of the second triboelectric member and so that the elastic member is disposed there-between. A fourth conductive layer is disposed on the dielectric layer opposite from the second conductive layer. A second load is in electrical communication with the third conductive layer and with the fourth conductive layer.

In yet another aspect, the invention is a method of making a triboelectric generator, in which a first conductive layer is applied on a selected surface of a first substrate. A triboelectric material is applied on the conductive layer. The triboelectric material layer includes a first material that has a first position on a triboelectric series. Application of the triboelectric material to the conductive layer generates a first triboelectric member. An elastic member is generated by applying a second conductive layer is applied to a dielectric elastic material having a predefined shape. The second conductive layer includes a second material that has a second position, different from the first position, on the triboelectric series. The dielectric elastic material has an elasticity that results in the elastic member returning to the predefined shape after being compressed. The second conductive layer of the elastic member is placed against the triboelectric material of the first triboelectric member. A load is electrically coupled between the first conductive layer and the second conductive layer.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
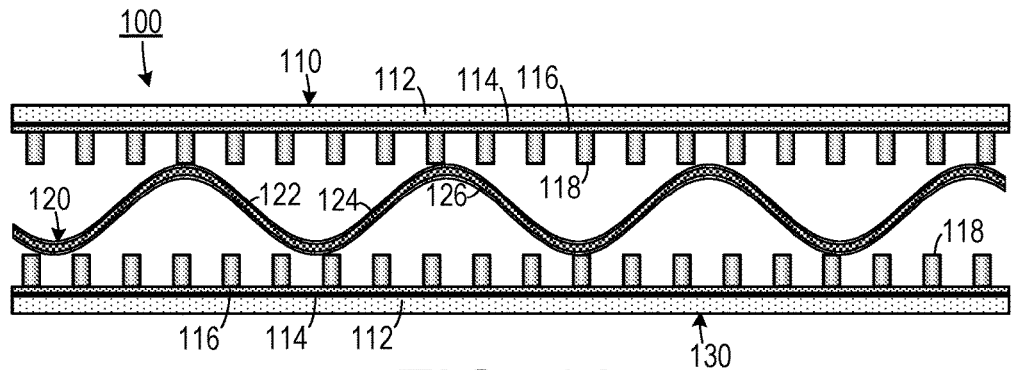
FIGS. 1A-1B are schematic diagrams showing an embodiment of a triboelectric generator with an undulated elastic member.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, "PTFE" means polytetrafluoroethylene, "PDMS" means polydimethylsiloxane, and polyimide is a material commercially known as "Kapton."

U.S. Pat. No. 9,178,446, filed by Wang et al. on Nov. 3, 2015 discloses a triboelectric generator and methods of making the same and is hereby incorporated by reference. U.S. Patent Publication Nos. US-2016-0040648-A1 (published on Feb. 11, 2016), US-2016-0070392-A1 (published on Mar. 10, 2016) and US-2016-0065091-A1 (published on Mar. 3, 2016), all filed by Wang et al., disclose triboelectric generators that employ contact triboelectrification and are hereby incorporated by reference.

Figure 1B:
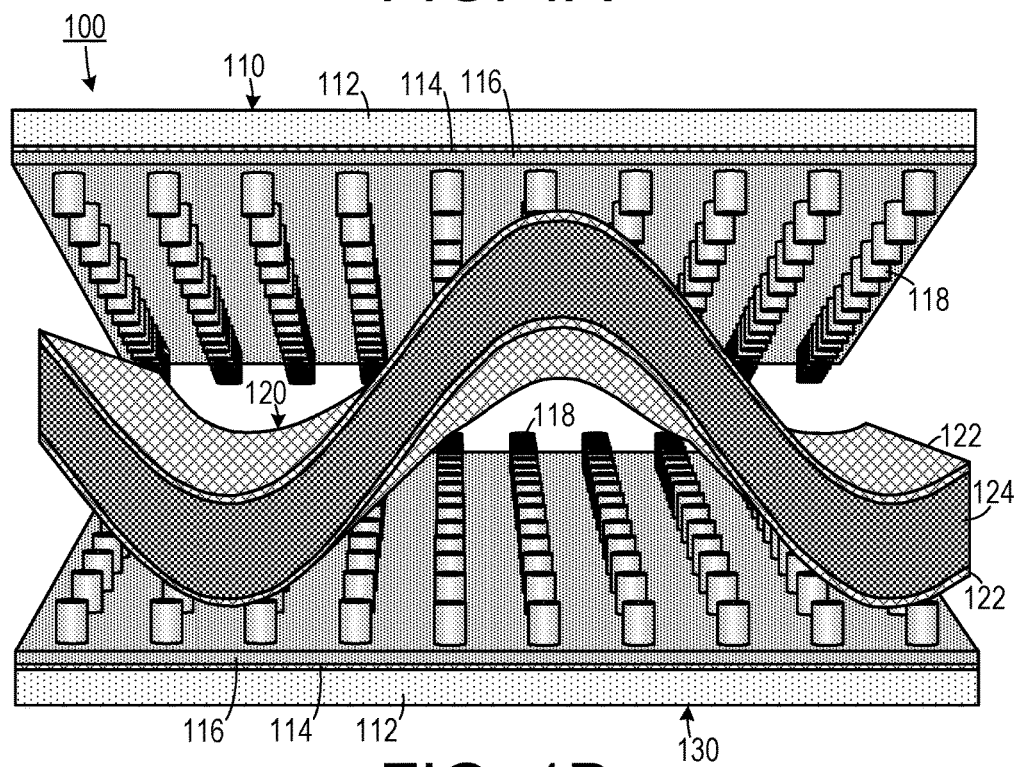

As shown in FIGS. 1A-1B, one embodiment of a triboelectric generator 100 includes a first triboelectric member 110, a second triboelectric member 130 and an elastic member 120 having an undulated shape (such as a wavy shape) disposed there-between. The first triboelectric member 110 and the second triboelectric member 130 each include a substrate 112 (such as an acrylic substrate) and a conductive layer 114 (such as a copper layer) disposed thereon. A triboelectric material layer 116 is disposed on the conductive layer 114. The triboelectric material layer 116 is made from an insulating material (such as PTFE) that has a first position on a triboelectric series. The triboelectric material layer 116 has a plurality of nanoscale protrusions 118 extending outwardly from a triboelectric material.

The elastic member 120 includes a dielectric elastic material layer 124 (such as a polyimide film, which in one example is Kapton available from DuPont) that has an elasticity that results in the elastic member 120 being deformed when compressed and returning to an original non-deformed shape after being decompressed. Each side of the elastic material layer 124 is coated with a second conductive material layer 122 (which can include, for example, copper) that includes a material having a second position, different from the first position, on the triboelectric series.

Figure 1C:
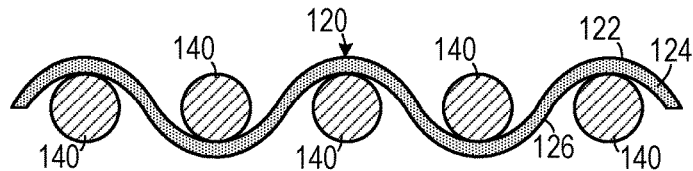
FIG. 1C is a schematic diagram showing one method of forming an undulated elastic member.

As shown in FIG. 1C, the elastic member 120 can be formed in an undulated wavy shape by weaving the elastic material layer 124 between parallel metal rods 140 and heating the elastic material layer 124 to the glass transition temperature of the elastic material layer 124 and then cooling the elastic material layer 124 to below the glass transition temperature. Once cooled, the elastic material layer 124 will maintain its wavy shape.

One experimental embodiment included a 125 µm thick Kapton film, a 125 µm thick PTFE film, a ¹⁄₁₆" thick acrylic substrate and copper. Firstly, the Kapton film was periodically bent into a wavy shape by using a set of metal rods (with diameter of ¼"). Then the set was sent into a muffle oven and baked at 360° C. for 4 hours. Since Kapton film is thermoplastic, it will remain in the wavy shape stably below its glass transition temperature. Then a 200 nm copper layer was sputtered on both sides of the wavy Kapton film as electrodes. Secondly, two slides of PTFE films were prepared by applying inductively coupled plasma (ICP) etching (specifically 15 sccm Ar, 10 sccm $O_2$ and 30 sccm CF4 under 400 W RF power and 100 W bias power) on one side of the films and nanostructures were thus obtained, which enhance contact-electrification. Then, a 200 nm thick layer of copper was subsequently sputtered on the other side of the film acting as electrodes. The copper side of the PTFE films was then tightly adhered to two acrylic substrates respectively by using a thin layer of cured PDMS. By sandwiching the Cu-Kapton-Cu wavy core using the two acrylic substrates with PTFE films facing inside and bonding the structures together with electrical tapes, the final device structure was obtained.

Figure 2A:
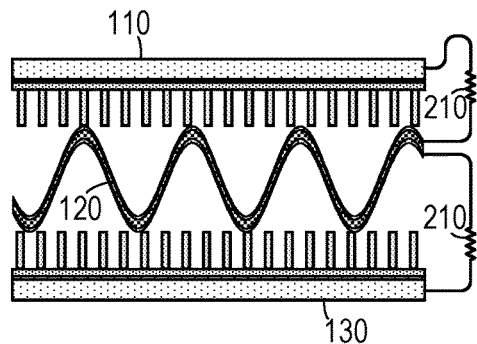
FIGS. 2A-2C is a series of schematic diagrams demonstrating current generation with a device according to the embodiment shown in FIGS. 1A-1B.
Figure 2B:
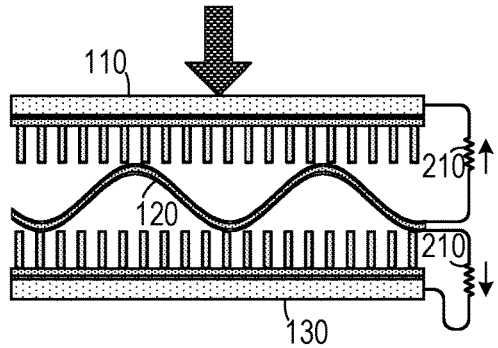
Figure 2C:
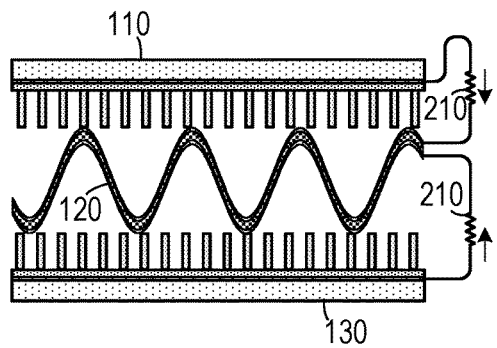

Operation of this embodiment is shown in FIGS. 2A-2C, in which a load 210 is electrically coupled between the conductive layers of the triboelectric members 110 and 130 and the conductive layers of the elastic member 120. Initially, as shown in FIG. 2A, the system is at rest and all of the charges are in balance. As shown in FIG. 2B, when a force is applied to the system (as represented by the arrow), the system compresses the elastic member 120, which causes increased surface area contact between the elastic member 120 and the triboelectric members 110 and 130. This results in triboelectric charge transfer there-between and current flow through the loads 210. When the compressive force is removed, as shown in FIG. 2C, the elastic member 120 returns to its at-rest shape, which reduces contact surface area with the triboelectric members 110 and 130, and which results in a charge imbalance. This results in reverse current flowing through the loads 210 to return the system to electrical equilibrium.

In operation, once the acrylic substrate is under impact, the wavy core will be compressed in the vertical direction and be extended in the horizontal direction, converting the vertical compressing force into lateral friction between the core and both PTFE surfaces. Also the contact area between PTFE and Cu film is increased and the average distance between the two is reduced. Once the impact is removed, the wavy core will retract on the horizontal direction and extend on the vertical direction, also leading to lateral friction between the core and both PTFE surfaces. Also the contact area between PTFE and Cu film is reduced and the average distance between the two is increased. The working process of triboelectric generator includes two parts: the charge transfer and charge separation. The transfer is accomplished by the lateral friction between the copper thin films, which lose electrons, and the PTFE films, which gain electrons. The charge separation process is accomplished by the change of capacitance between the copper coated on Kapton film and the copper coated on the back side of the PTFE films.

Figure 3:
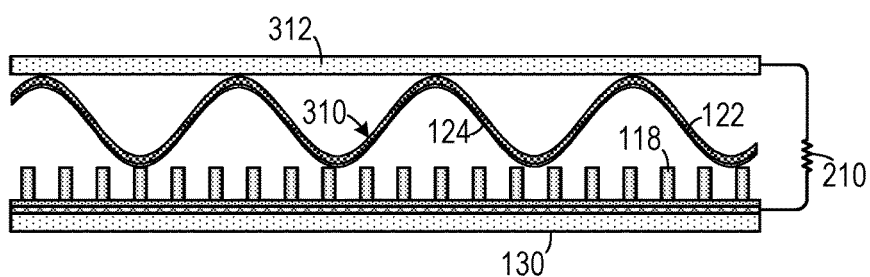
FIG. 3 is a schematic diagram of a triboelectric generator employing a single triboelectric member.

As shown in FIG. 3, a triboelectric generator can be made with a single triboelectric member. In this embodiment, the elastic member 310 is placed against a second substrate 312.

This embodiment is based on a wavy structured Cu-Kapton-Cu film sandwiched between two flat nanostructured PTFE films for harvesting energy due to mechanical vibration, impacting and compressing using the triboelectrification effect. This structure design allows the triboelectric generator to be self-restorable after impact without the use of extra springs and converts direct impact into lateral sliding, which is proved to be a much more efficient friction mode for energy harvesting. In one experimental embodiment, vibrational energy from 5 Hz to 500 Hz was harvested and the generator's resonance frequency was determined at ~100 Hz at a broad full width at half maximum (FWHM) of over 100 Hz, producing an open-circuit voltage of up to 72 V, a short-circuit current of up to 32 µA and a peak power density of 0.4 W/m2. The wavy structure of the triboelectric generator can be easily packaged for harvesting the impact energy from water waves, clearly establishing the principle for ocean wave energy harvesting. Considering the advantages of triboelectric generator, such as cost-effectiveness, light weight and easy scaling up, this approach might open the possibility for seeking green and sustainable energy from the ocean using nanostructured materials.

To study the ability of triboelectric generator to power external loads, one experimental embodiment was tested at 100 Hz under variable load resistance. An adjustable resistor was used as the load, providing resistance from as low as 1 KΩ to as high as 100 MΩ. The electrometer was connected in parallel with the resistor to measure the output voltage and was connected in series with the resistor to measure the output current. It was found that output voltage increases with increasing load resistance while the output current increases with decreasing load resistance. Instantaneous peak power density, calculated by Pd=I2R/S, demonstrated that the highest peak power density of 0.4 W/m2 was obtained at the load resistance of 5 MΩ.

Figure 4A:
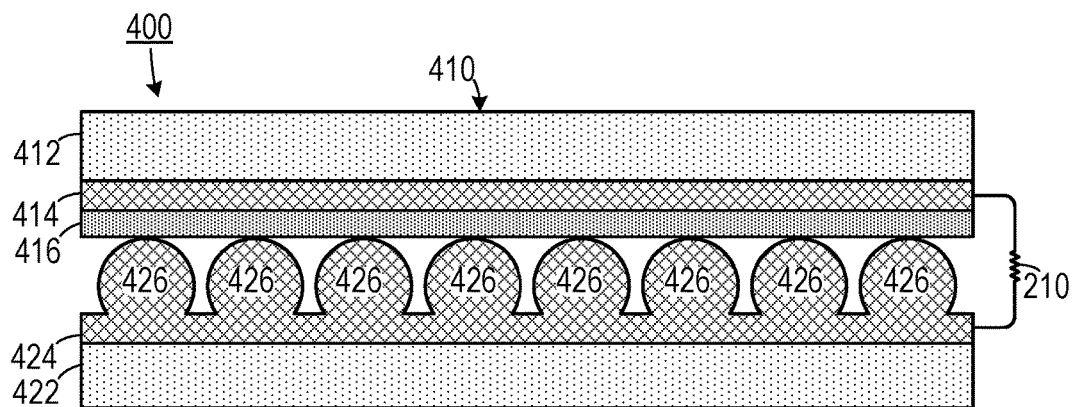
FIGS. 4A-4C is a series of schematic diagrams showing an embodiment employing an elastic member with partial spheres and operation of this embodiment.
Figure 4B:
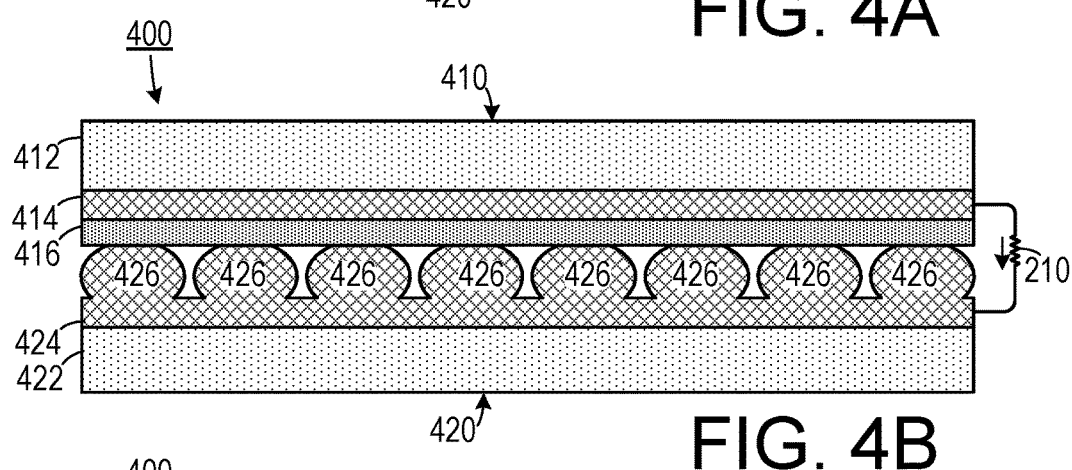
Figure 4C:
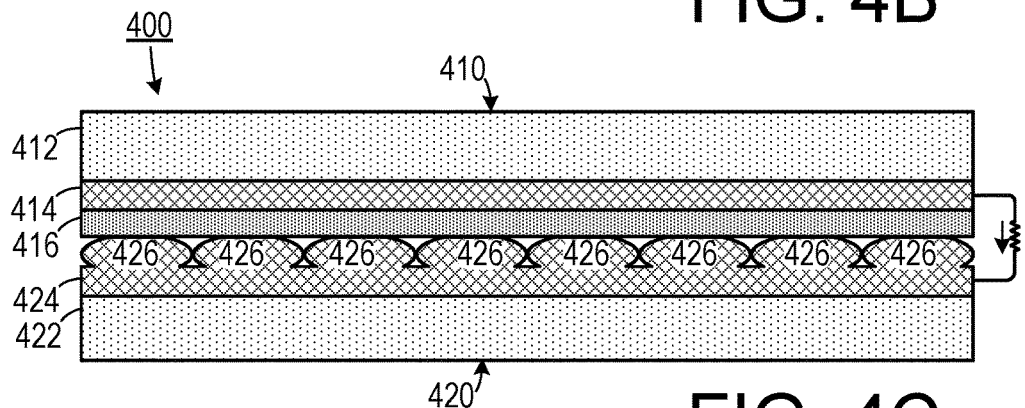
Figure 4D:
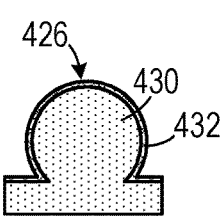
FIG. 4D is a cross-sectional diagram of a partial sphere employed in an elastic member.
Figure 5A:
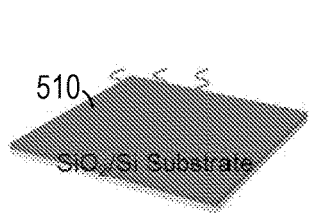
FIGS. 5A-5I is a series of schematic diagrams demonstrating one method of making an elastic member employing partial spheres.
Figure 5B:
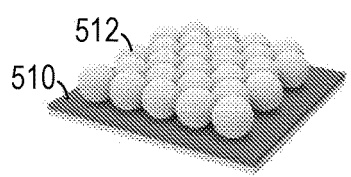
Figure 5C:
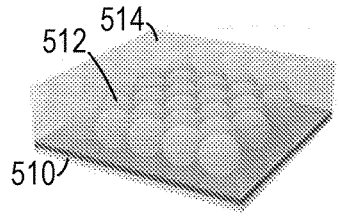
Figure 5D:
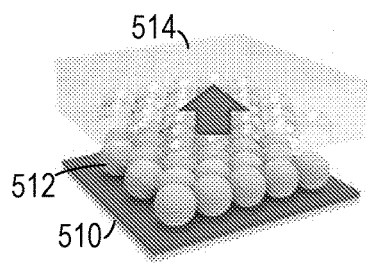
Figure 5E:
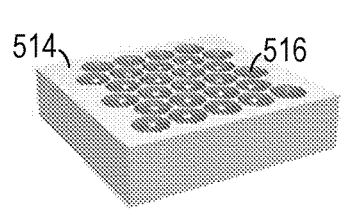
Figure 5F:
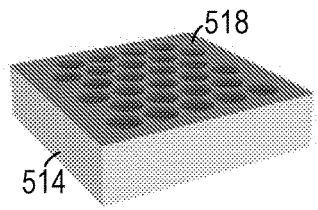
Figure 5G:
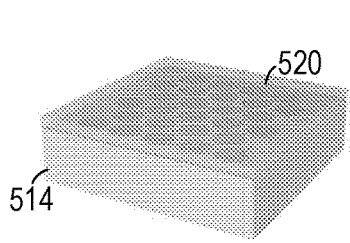
Figure 5H:
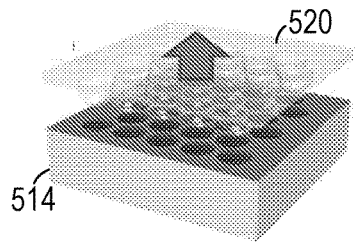
Figure 5I:
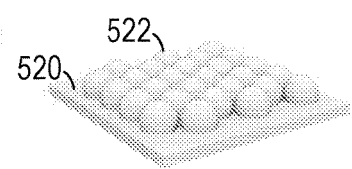

As shown in FIGS. 4A-4C, one embodiment of a triboelectric generator 400 includes an elastic member that employs an elastic member 424 that has a plurality of three-dimensional shapes extending upwardly from a copper layer in which each of the three-dimensional shapes having an outer surface that includes copper. In the embodiment shown, the three-dimensional shapes are partial spheres 426, which are in contact with the triboelectric material layer 416 (such as PTFE) of the triboelectric member 410. As shown in FIG. 4D, each partial sphere 426 can include a PDMS core 430 with a copper coating layer 432. Returning to FIGS. 4A-4C, the triboelectric member 410 includes a substrate 412, a conductive layer 414 and a triboelectric material layer 416. The elastic member 424 is mounted on a substrate 420. When a compressive force is applied, as shown in FIG. 4B, the partial spheres 426 are compressed, thereby increasing their contact surface area with the triboelectric material layer 416, which results in contact electrification and current flow through the load 210. Eventually, the partial spheres 426 will become maximally compressed, as shown in FIG. 4C. Decompression of the system will cause the partial spheres 426 to return to their undeformed shape and reverse current to flow through the load 210 during the decompression process.

As shown in FIGS. 5A-5I, one method for making the partial spheres includes: treating a silicon or quartz substrate 510 with oxygen plasma to flatten its surface and placing a layer of closely packed polystyrene spheres 512 on the substrate 510. (One method for placing spheres on a substrate is disclosed in U.S. Pat. No. 7,351,607, issued to Wang et al. on Apr. 1, 2008, which is hereby incorporated by reference.) (Experimentally, polystyrene spheres of the following diameters were used: 90 µm, 600 µm, and 3 mm.) A PDMS slurry 514 is placed around the spheres 512 and the PDMS slurry 514 is cured. The cured PDMS layer 514 is lifted from the spheres 512, thereby leaving a PDMS mold 516 of the spheres. A conductive material layer coating 518 is applied to the mold 516 and a second PDMS slurry 520 is applied to the mold 516. The PDMS 520 is cured and removed from the mold 514, thereby leaving the elastic partial spheres 522 employed in the elastic member of the triboelectric generation.

In operation, at the initial state, the top area of Cu-deposited hemispheres-array-structured film created a point of contact with PTFE film, where there is no charge transfer, which results in no electric potential. When a compressive force is applied to the device, the Cu-deposited hemispheres-array-structured film starts to be deformed and dimensional flat contact area is created with PTFE film accordingly. The contact area between the hemispheres-array-structured film and PTFE film depends on the applied compressive force. Positive triboelectric charges on the surface of hemispheres-array-structured film, and negative triboelectric charges on the PTFE film are created by the triboelectric effect. At this stage, the device remains in electrostatic equilibrium state due to negligible dipole moment. As compression on the device is released, a strong dipole moment is formed due to the electrostatic effect, which results in an electrical potential difference between the bottom and top electrodes. Because the Cu-deposited hemispheres-array-structured film has a higher potential than the top Al electrode, electrons start to flow from the top electrode to the bottom electrode through the external circuit to neutralize the negative triboelectric charges in the top electrode, which results in electric signal observed from the device.

Output performance of the device is determined by two dominant effects. One is the triboelectric effect that is created by periodic contacts between two materials that differ in polarity of triboelectricity. Another one is the electrostatic effect that is made by the potential difference between two charged materials when those are mechanically separated.

Figure 6:
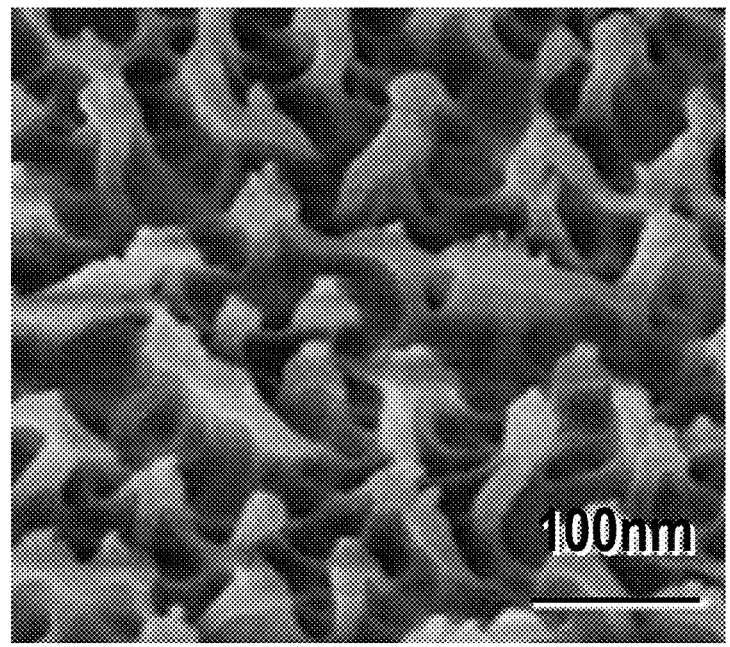
FIG. 6 is a micrograph of a nanoscale protrusions extending outwardly from a triboelectric material.
Figure 7:
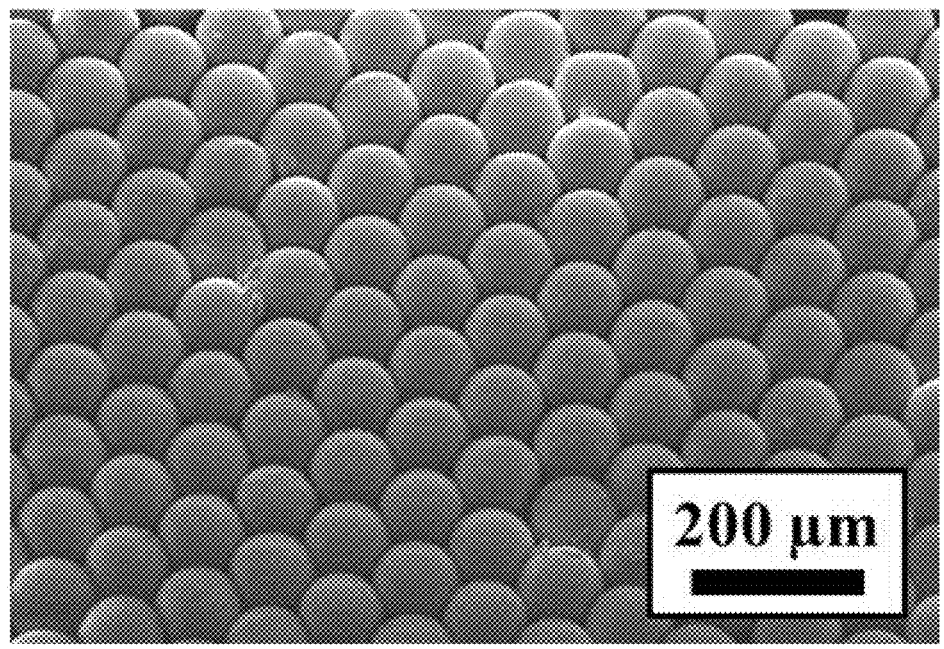
FIG. 7 is a micrograph of an elastic member employing partial spheres.

A micrograph of the nanoscale texture applied to the triboelectric member in the embodiment of FIG. 1A is shown in FIG. 6. A micrograph of the partial spheres used in the embodiment of FIG. 4A is shown in FIG. 7.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A triboelectric generator, comprising
   (a) a first triboelectric member, including a first conductive layer and an insulating triboelectric material layer disposed on the first conductive layer, the triboelectric material layer including a first material that has a first position on a triboelectric series;
   (b) an elastic member disposed against the triboelectric material layer of the triboelectric member, including a second conductive material, the elastic member having an elasticity that results in the elastic member being deformed when compressed and returning to an original non-deformed shape after being compressed, the second conductive material having a second position, different from the first position, on the triboelectric series; and
   (c) a first load that is in electrical communication with the first conductive layer and with the second conductive material, so that when a force drives the first triboelectric member against the elastic member, thereby compressing the elastic member, and after the force is released from the first triboelectric member charges will flow between the first conductive layer and the second conductive layer through the load.

2. The triboelectric generator of claim 1, wherein the elastic member has an undulated shape.

3. The triboelectric generator of claim 1, wherein the elastic member includes a dielectric layer disposed adjacent to the second conductive material.

4. The triboelectric generator of claim 3, wherein the dielectric layer comprises a polyimide film.

5. The triboelectric generator of claim 1, wherein the triboelectric material comprises PTFE and wherein the second conductive material comprises copper.

6. The triboelectric generator of claim 1, further comprising a plurality of nanoscale protrusions extending outwardly from the triboelectric material.

7. The triboelectric generator of claim 1, wherein the first triboelectric member further comprises a substrate on which the first conductive layer is disposed.

8. The triboelectric generator of claim 1, wherein the first conductive layer comprises copper and wherein the insulating triboelectric material layer comprises PTFE.

9. The triboelectric generator of claim 1, wherein the elastic member includes a plurality of three dimensional shapes extending upwardly from a copper layer, each of the three dimensional shapes having an outer surface that includes copper.

10. The triboelectric generator of claim 9, wherein each of the three dimensional shapes has a PDMS core.

11. The triboelectric generator of claim 9, wherein each of the three dimensional shapes has a partially spherical shape.

12. An electrical generator, comprising:
    (a) a first triboelectric member, including a first conductive layer and a triboelectric material layer disposed on the first conductive layer, the triboelectric material layer including a plurality of nanoscale protrusions extending outwardly therefrom, the triboelectric material layer including a first material that has a first position on a triboelectric series;
    (b) an elastic member having an undulated shape disposed against the triboelectric material layer of the triboelectric member, including a dielectric layer and a second conductive layer disposed on the dielectric layer, the dielectric layer having an elasticity that results in the elastic member returning to the undulated shape after being compressed, the second conductive layer including a second material that has a second position, different from the first position, on the triboelectric series;
    (c) a first load that is in electrical communication with the first conductive layer and with the second conductive layer, so that when a force drives the first triboelectric member against the elastic member, thereby compressing the elastic member, and after the force is released from the first triboelectric member charges will flow between the first conductive layer and the second conductive layer through the load;
    (d) a second triboelectric member spaced apart from the first triboelectric member, including a fourth conductive layer and a triboelectric material layer disposed on the third conductive layer, the triboelectric material layer including a plurality of nanoscale protrusions extending outwardly therefrom, the triboelectric material layer including the first material, the second triboelectric member disposed so that the plurality of nanoscale protrusions of the first triboelectric member face the plurality of nanoscale protrusions of the second triboelectric member and so that the elastic member is disposed there-between;

(e) a fourth conductive layer disposed on the dielectric layer opposite from the second conductive layer; and (f) a second load that is in electrical communication with the third conductive layer and with the fourth conductive layer.

13. The electrical generator of claim 12, wherein the triboelectric material layer comprises PTFE.

14. The electrical generator of claim 12, wherein the first conductive layer comprises copper.

15. The electrical generator of claim 12, wherein the second conductive layer comprises copper.

16. The electrical generator of claim 12, wherein the dielectric layer comprises a polyimide film.

* * * * *